United States Patent [19]

Sheridan et al.

[11] 4,308,048
[45] Dec. 29, 1981

[54] PRODUCTION OF AMMONIUM POTASSIUM POLYPHOSPHATES

[75] Inventors: Richard C. Sheridan, Sheffield; John F. McCullough; Leland L. Frederick, both of Florence, all of Ala.

[73] Assignee: Tennessee Valley Authority, Muscle Shoals, Ala.

[21] Appl. No.: 121,184

[22] Filed: Feb. 13, 1980

Related U.S. Application Data

[63] Continuation of Ser. No. 76,007, Sep. 17, 1979, now Defensive Publication No. T996,001.

[51] Int. Cl.³ .................... C05B 7/00; C05B 13/06
[52] U.S. Cl. .................................. 71/36; 71/29; 71/64.10
[58] Field of Search .................. 71/28–30, 71/36, 41, 43, 51, 64 C, 64.10; 423/306

[56] References Cited

U.S. PATENT DOCUMENTS

T973,004  8/1978  Stinson et al. ............... 71/29
3,347,656 10/1967  Potts et al. .................. 71/36

Primary Examiner—S. Leon Bashore
Assistant Examiner—Ferris H. Lander
Attorney, Agent, or Firm—Robert A. Petrusek

[57] ABSTRACT

Embodiment No. 1. Urea phosphate prepared from wet-process phosphoric acid is heated with monopotassium orthophosphate in a mole ratio of 0.25 to 4.0 at 130° to 200° C. to form an ammonium potassium polyphosphate having an average chain length between 1.2 and 2.5. The ammonium potassium polyphosphate is dissolved in aqueous ammonia to yield concentrated fertilizer solutions containing the three major nutrients and over 50 percent total plant food.

Embodiment No. 2. Phosphoric acid containing 54 to 76 percent $P_2O_5$ is heated with urea (urea:$H_3PO_4$ mole ratio 0.5 to 2.0) and monopotassium orthophosphate (urea:$KH_2PO_4$ mole ratio 0.25 to 4.0) at 130° to 200° C. to form an ammonium potassium polyphosphate having an average chain length between 1.2 and 2.5. The ammonium potassium polyphosphate is dissolved in aqueous ammonia to yield concentrated fertilizer solutions containing the three major nutrients and over 50 percent total plant food.

3 Claims, 2 Drawing Figures

PREPARATION OF AMMONIUM
POTASSIUM POLYPHOSPHATE

PREPARATION OF AMMONIUM
POTASSIUM POLYPHOSPHATE

PREPARATION OF AMMONIUM
POTASSIUM POLYPHOSPHATE

PRODUCTION OF AMMONIUM POTASSIUM POLYPHOSPHATES

The invention herein described may be manufactured and used by or for the Government for governmental purposes without the payment to us of any royalty therefor.

This application is a continuation of application Ser. No. 76,007, filed Sept. 17, 1979, for PRODUCTION OF AMMONIUM POTASSIUM POLYPHOSPHATES, now Defensive Publication No. T996,001, July 1, 1980.

The present invention relates to the production of ammonium potassium polyphosphates. More particularly, the present invention relates to the production of short-chain, highly soluble ammonium potassium polyphosphates by the reaction of monopotassium orthophosphate and urea phosphate or monopotassium orthophosphate, urea, and phosphoric acid.

Liquid mixed fertilizers having compositions similar to those of standard dry mixed fertilizers are well known and are increasing in popularity in the industry. Such fertilizers have numerous advantages over dry mixed fertilizers in that cost of evaporating moisture and the bagging operation are eliminated. Such liquids greatly simplify the operation of applying plant nutrients to the soil. Furthermore, the use of liquid fertilizers effectively eliminates the difficulties due to segregation and caking often encountered in storing dry fertilizers.

However, liquid fertilizers have in the past had some outstanding disadvantages. Raw material costs have proven to be relatively high, and solids may form at low temperatures, resulting in difficulty in pumping and the plugging of small discharge orifices in application equipment. These disadvantages often outweigh the benefits derived from the elimination of the evaporation and bagging steps involved in the preparation of conventional dry mixed fertilizers.

A large fraction of solution fertilizers applied to crops contains the three primary plant nutrients (N, $P_2O_5$, and $K_2O$). Some of the leading grades are 7-21-7, 8-25-3, and 4-11-11. NPK solution fertilizers are ordinarily prepared from crystalline potassium chloride and ammonium polyphosphates supplied as base solutions (10-34-0 or 11-37-0) or prepared on site from ammonia, concentrated ortho- or superphosphoric acid, and urea ammonium nitrate solution (28-32 percent N). The maximum plant nutrient content ($N+P_2O_5+K_2O$) in these NPK solution fertilizers is limited to about 36 percent by the relatively low solubility of potassium chloride. It would be economically advantageous for the NPK solution fertilizers to have higher plant nutrient concentrations. A way of markedly increasing the concentration is to substitute the highly soluble, short-chain potassium polyphosphates for potassium chloride.

In addition to limiting the concentration of NPK solution fertilizers, chlorides are quite deleterious to both the growth and quality of some crops such as tobacco. Furthermore, chlorine-free solutions are required for the foliar feeding of soybeans.

Thus, it is apparent that a need exists for concentrated, stable, chloride-free solution fertilizers containing the three primary plant nutrients; such solutions can be prepared by the use of short-chain potassium and ammonium polyphosphates. The prior art shows that attempts have been made to develop processes for the production of these materials. However, the attempts have had limited success because of technical and/or economic reasons.

In U.S. Pat. No. 3,022,154, John M. Potts et al, a process is disclosed for the production of stable, concentrated fertilizer solutions having grades such as 0-27-36, 0-25-25, and 0-29-31. However, the process is based on the use of primarily electric furnace superphosphoric acid containing 75–77 percent $P_2O_5$ and concentrated potassium hydroxide containing 45–67 percent KOH. Furnace superphosphoric acid is relatively expensive not now widely available, while potassium hydroxide is the most expensive form of potash fertilizers. Although the process is technically feasible, it is impractical because of these economic factors.

In U.S. Pat. No. 3,784,367, William Percy Moore, another process is disclosed for the production of potassium polyphosphate fertilizer solutions. Concentrated wet-process phosphoric acid containing polyphosphoric acids is reacted with potassium chloride at elevated temperatures in the presence of a dehydrochlorination catalyst. Most of the hydrogen chloride is evolved and the melt is dissolved in aqueous ammonia to give solutions containing up to 53 percent plant nutrients. Unfortunately, considerable amounts of energy are required to concentrate merchant-grade phosphoric acid to a $P_2O_5$ content of 69–76 percent. Furthermore, additional energy is required to maintain the reaction mixture at 200°–300° C. for the necessary period of time. The process suffers also from other drawbacks—substantial amounts of a catalyst such as ammonium thiosulfate are used, and the wet hydrogen chloride byproduct presents a serious corrosion problem.

A novel and economically viable process for the production of potassium orthophosphate has been developed recently (*Chemical Engineering*, Apr. 5, 1971, pp. 83–85; *Phosphorus and Potassium*, No. 91, Sept./Oct. 1977). Monopotassium orthophosphate is a good solid fertilizer, but it is not soluble enough to prepare concentrated solution fertilizers. Attempts to convert $KH_2PO_4$ into highly soluble, short-chain potassium polyphosphates generally have failed because of the formation of insoluble, highly condensed metaphosphate.

A process for the preparation of ammonium potassium polyphosphate was disclosed in U.S. Pat. No. 3,549,347, J. W. Lyons et al. Their process is based on the thermal condensation of urea, ammonium orthophosphate, and $KH_2PO_4$; but the product is a substantially water-insoluble, long-chain polyphosphate which cannot be utilized in the production of fertilizer solutions. A similar process was also disclosed in U.S. Pat. No. 3,419,349, H. A. Rohlfs et al; their product was a long-chain, water-insoluble material, also. Thus, the prior art teaches that the reaction of urea with $KH_2PO_4$ leads to the formation of long-chain, water-insoluble polyphosphates. The long-chain polyphosphates contain about 50 or more phosphorus atoms per molecule and are quite different from the short-chain polyphosphates both in structure and in physical properties. Short-chain polyphosphates are defined as those phosphates containing two to eight phosphorus atoms per molecule. Typical examples are pyrophosphate, tripolyphosphate, tetrapolyphosphate, and pentapolyphosphate. The ammonium and potassium salts of these polyphosphates are highly soluble in water and make excellent solution fertilizers. Therefore, an improved method is needed for the synthesis of short-chain potassium polyphosphates.

In view of the foregoing, it is an objective of the present invention to provide an improved process for producing ammonium potassium polyphosphate solutions from wet-process phosphoric acid.

It is a further object of the present invention to provide an economical process for producing a liquid ammonium potassium polyphosphate fertilizer from wet-process phosphoric acid, wherein the available amount of phosphoric anhydride is totally water soluble.

Another object of the present invention is to provide an economical method for the conversion of monopotassium orthophosphate into short-chain, highly soluble ammonium potassium polyphosphate.

Yet another object of the present invention is to provide a process for the production of concentrated liquid mixed fertilizers from wet-process phosphoric acid, monopotassium orthophosphate, and urea.

These and other objects and advantages, which will be obvious hereinafter, are achieved by the present invention which is set forth in the following description.

According to the present invention, ammonium potassium polyphosphate solutions are produced by reacting monopotassium orthophosphate with urea phosphate or phosphoric acid and urea and dissolving the resulting pyrolyzate melt in water or aqueous ammonia and adjusting the pH of the resulting solution to about 6.0 with ammonia.

The urea phosphate utilized in the process of the present invention can be obtained in relatively pure form by the reaction of urea with wet-process phosphoric acid by methods that are well known in the fertilizer industry, for example, as described in U.S. Pat. No. 3,356,448, Turner, and British Pat. Nos. 1,149,924, Douglas Keens, Apr. 23, 1969; 1,191,635, Koehner et al, May 13, 1970; and 1,397,945, Mansfield, June 18, 1975; and the teachings therein are incorporated herein by reference thereto. The condensation of relatively pure urea phosphate with $KH_2PO_4$ yields a pyrolyzate suitable for the production of high-quality base solutions which are relatively free of metallic impurities. These solutions are stable and can be blended with other fertilizer ingredients in the preparation of liquid mixed fertilizers. In another embodiment of the present invention, impure wet-process phosphoric acid can be utilized directly by pyrolyzing it with urea and $KH_2PO_4$ to give an impure polyphosphate solution for temporary storage or immediate application.

This invention, together with further objects and advantages thereof, will be better understood from a consideration of the following description taken in connection with the accompanying drawings in which.

Figure 1:
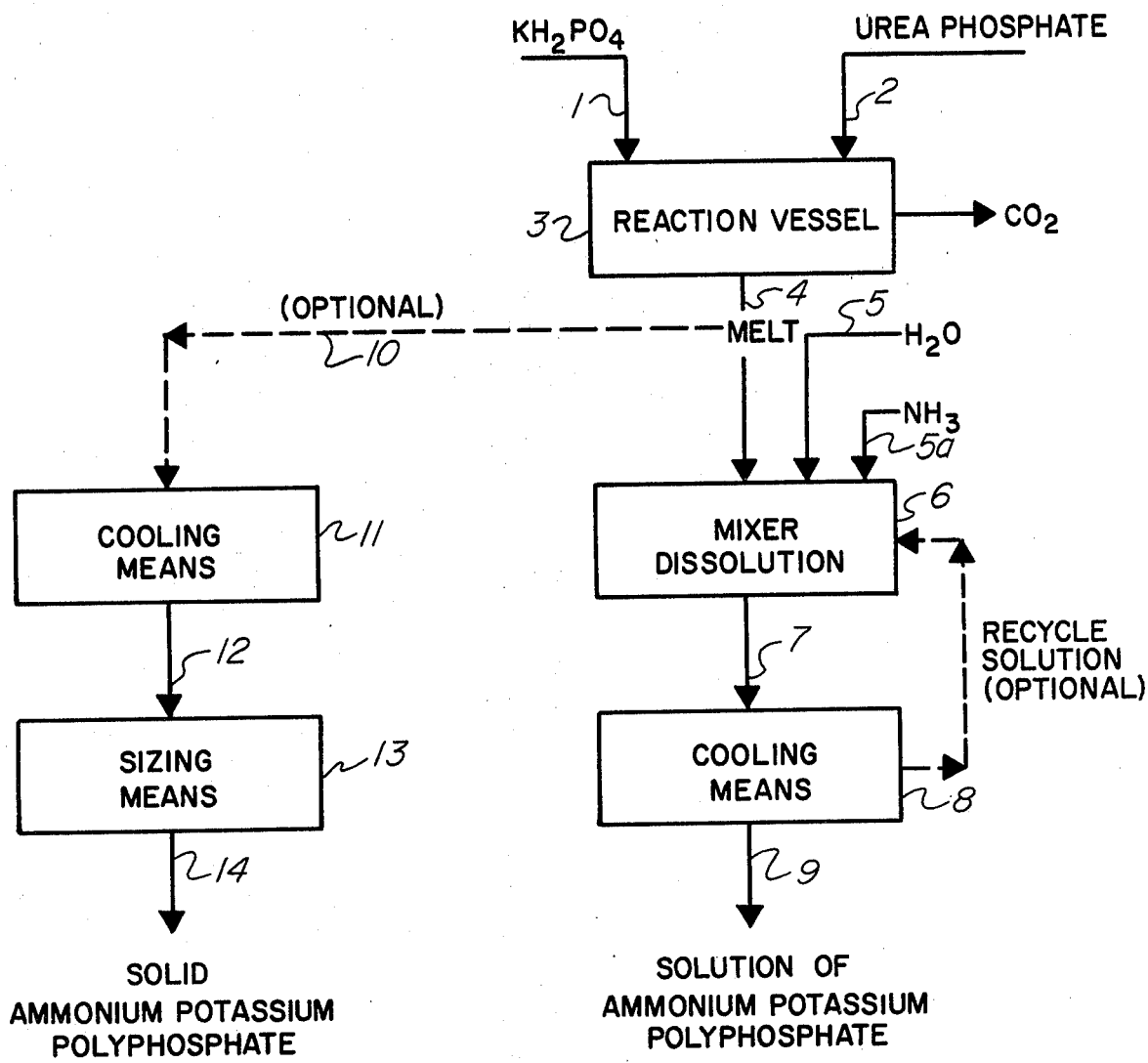
FIG. 1 is a flowsheet illustrating the novel process in which short-chain ammonium potassium polyphosphates are prepared from urea phosphate and monopotassium orthophosphate.

Referring now more specifically to FIG. 1, vessel 3 represents any means suitable for containing, mixing, and heating the charge. A stream of urea phosphate from a source not shown is introduced via line 2 into vessel 3. Simultaneously, if desired, a stream of monopotassium phosphate, $KH_2PO_4$, from a source not shown is also introduced via line 1 into vessel 3 to form therein with said urea phosphate resulting molten ammonium potassium polyphosphates. Carbon dioxide is expelled from the resulting reaction mixture as said polyphosphate forms. According to one embodiment of the instant invention, the molten intermediates in vessel 3 is fed via line 4 to mixer 6 wherein it is dissolved in water and ammoniated to a pH value of approximately 6.0–6.1, said water and ammonia added to mixer 6 from sources not shown via lines 5 and 5a, respectively. The resulting hot, concentrated solution of ammonium potassium polyphosphate is withdrawn from mixer 6 via line 7 and fed into cooling means 8. The cooled solution is subsequently removed from cooling means 8 via line 9 as product ammonium potassium polyphosphate fluid fertilizer. According to another embodiment of the instant invention, part or all of the melt withdrawn from vessel 3 via line 4 is fed via line 10 to cooling means 11 wherein solidification occurs. The resulting solid product is subsequently fed via line 12 to a crusher and granulator generally illustrated as sizing means 13. Solid ammonium potassium polyphosphate is removed from sizing means 13 via line 14 as product.

Figure 2:
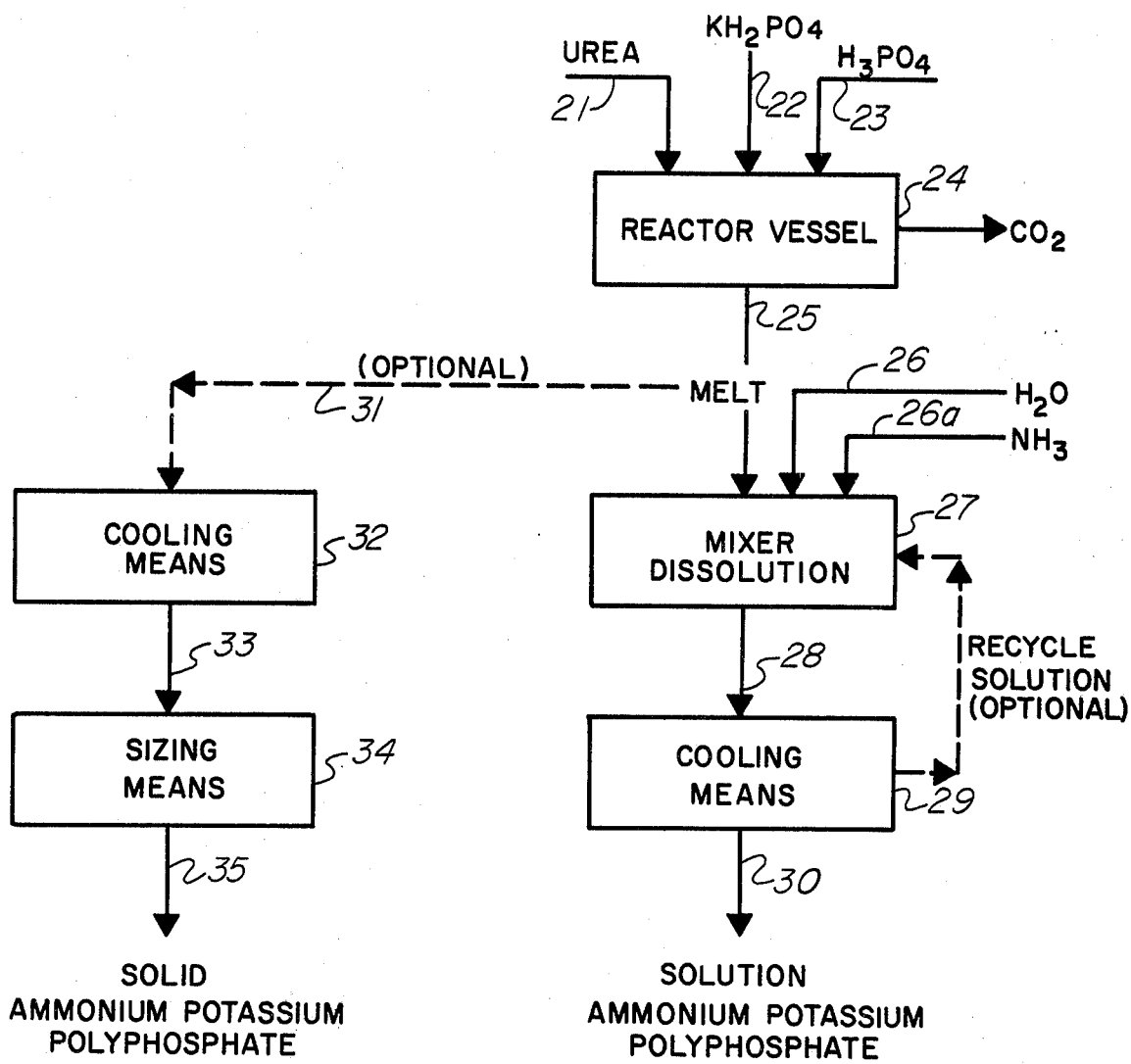
FIG. 2 is a flowsheet illustrating the novel process in which short-chain ammonium potassium polyphosphates are prepared from phosphoric acid, urea, and monopotassium orthophosphate.

Referring now more specifically to FIG. 2, vessel 24 represents any means suitable for containing, mixing, and heating the charge. The charge comprises urea, monopotassium orthophosphate and phosphoric acid as shown, to wit, urea is fed from a source not shown via line 21; monopotassium orthophosphate is fed from a source not shown via line 22; and phosphoric acid is fed from a source not shown via line 23 into vessel 24 wherein is produced a resulting molten ammonium potassium polyphosphate. Carbon dioxide generated in said charge in said vessel 24 is expelled from the reaction mixture as said polyphosphate forms. According to one embodiment of the instant invention, the resulting molten intermediate product formed in vessel 24 is withdrawn therefrom via line 25 and introduced into mixer 27 where it is dissolved in aqueous ammonia and wherein the pH is adjusted to about 6.0 to about 6.1. As shown, the aqueous ammonia may be introduced into mixer 27 by means of feeding water from a source not shown via line 26 and anhydrous ammonia from a source not shown via line 26a to mixer 27. If desired, the water and ammonia may be combined outside the confines of mixer 27 and introduced thereinto as aqueous ammonia. Similarly, the introduction of water and ammonia into mixer 6 in FIG. 1 supra, of course, may be first combined outside of the confines of said mixer 6 and introduced thereinto as aqueous ammonia. Returning again to FIG. 2, the resulting hot concentrated solution in mixer 27 is subsequently withdrawn therefrom via line 28 and introduced into cooling means 29. Subsequently the cooled solution is removed from cooling means 29 via line 30 as product ammonium potassium polyphosphate fertilizer. According to another embodiment of the instant invention, part or all of the melt is withdrawn from vessel 27 via line 25 and further by means of line 31 introduced into cooling means 32 wherein solidification of the melt occurs. Subsequently, the resulting cooled, solid product in cooling means 32 is fed via line 33 to crushing, grinding, and granulating means generally illustrated as sizing means 34 for final processing. Solid ammonium potassium polyphosphate is removed from sizing means 34 via line 35 as product.

In practicing the various embodiments of the instant invention as described in detail and in conjunction with FIGS. 1 and 2, supra, a reaction temperature of 130° to 200° C., preferably 150° to 175° C., is utilized. The reaction time will vary somewhat, depending upon the temperature, ratio of urea phosphate to $KH_2PO_4$, and average chain length desired in the product. At a temperature of 175° C. and a urea phosphate to KH$_2$PO$_4$ mole ratio of 1.0, a typical reaction time is 15 minutes. On the other hand, a reaction time of two to three minutes is sufficient when the temperature is 175° C. and a urea phosphate to KH$_2$PO$_4$ mole ratio of 2.0 is used. At lower temperatures, such as 150° C., a longer reaction time such as 20 minutes may be required to obtain the amount of condensation desired.

The average chain length of a phosphate is defined as the ratio of phosphorus atoms to phosphate molecules in a sample. For example, a mixture consisting of one mole of orthophosphate and one mole of pyrophosphate has an average chain length of 1.50. The average chain length of the product of the pyrolysis of urea phosphate with KH$_2$PO$_4$ may range from about 1.2 to about 2.5, but the preferred range is about 1.4 to about 1.9. This corresponds to pyrolyzates that contain 54 to 80 percent polyphosphates, including 44 percent pyro-, 8 to 21 percent tri-, 1 to 9 percent tetra-, and up to 6 percent or more highly condensed polyphosphates than the tetra. A high concentration of shortchain linear polyphosphates is desirable for two reasons. First, the shortchain ammonium and potassium polyphosphates have very high solubilities in water, and this property enhances the preparation of concentrated fertilizer solutions. Secondly, the polyphosphates sequester the metallic ions such as iron, magnesium, and aluminum that are typically found in phosphoric acid prepared by the wet-process method. The metallic impurities are thereby held in solution by the polyphosphates and precipitation reactions are avoided.

The mole ratio of urea phosphate to KH$_2$PO$_4$ may range from 0.25 to 4.0, but the preferred range is 0.67 to 2.0. This range will permit the attainment of a preferred average chain length at a preferred temperature.

The ammonium potassium polyphosphate melt may be cooled and stored but desirably is quenched directly in aqueous alkaline solution. The preferred solvent is aqueous ammonia of sufficient concentration to produce a solution containing about 5 to 10 percent nitrogen, 10 to 15 percent K$_2$O, and 30 to 40 percent P$_2$O$_5$. The temperature during dissolution is preferably maintained at about 30° to 100° C. If desired, the product potassium polyphosphate solution is readily filtered to remove any solid material.

A mixture of KH$_2$PO$_4$, urea, and phosphoric acid may be pyrolyzed equally as well as the mixture of urea phosphate and KH$_2$PO$_4$. Phosphoric acid which contains 69 to 72 percent P$_2$O$_5$ is preferred, but regular merchant-grade phosphoric acid containing about 54 percent P$_2$O$_5$ can be utilized if desired.

In this process part of the urea is consumed by the condensation of phosphate. Laboratory tests show that a mole of urea is decomposed into ammonia and carbon dioxide for each mole of water released by condensation of phosphate. The carbon dioxide is expelled as a gas from the acidic melt, but none of the liberated ammonia is lost because it is absorbed and fixed by the phosphoric acid as an ammonium phosphate. The undecomposed urea remains in the melt and is readily dissolved along with the product ammonium potassium polyphosphate in the fertilizer solutions. Thus, none of the nitrogen in the urea charged to the reactor is lost, and it is completely utilized as plant food.

The liquid ammonium potassium polyphosphate product of this process has particular value in the fertilization of crops because of its ability to supply easily dispensed primary nutrients as well as trace amounts of micronutrients, particularly iron as soluble complex compounds. Such solutions will remain free from precipitated iron and aluminum compounds for at least 30 days at normal temperatures. The solutions may be stored also at low temperatures such as 0° C. for extended periods without the formation of solids which tend to clog pumps and spray nozzles of application equipment.

In order that those skilled in the art may better understand how the present invention can be practiced and more fully and definitely understood, the following examples are given by way of illustration and not necessarily by way of limitation.

EXAMPLE I

Urea phosphate (41.1 grams) and monopotassium orthophosphate (8.9 grams) were mixed in a mole ratio of 4.0 in a 600-ml stainless steel beaker. The beaker and its contents were then heated in an oil bath at 150° C. for 20 minutes with rapid stirring of the charge. The resulting product was a fluid melt. At the end of the heating period, the molten product was quenched to about room temperature by removing the beaker from the oil bath and immersing it in an ice-water bath. The quenched product was a friable solid, was easily broken up and removed from the beaker, and it was also readily crushed and ground in a mortar. The product was somewhat hygroscopic and tended to become sticky unless protected from atmospheric moisture. The quenched product contained 16.0 percent total N, 11.0 percent NH$_4$-N, 9.2 percent urea, 55.0 percent P$_2$O$_5$, and 7.3 percent K$_2$O. The phosphate was distributed as 13.0 percent ortho-, 36.9 percent pyro-, 28.0 percent tri-, 13.6 percent tetra-, 5.6 percent penta-, and 5.3 percent more highly condensed polyphosphate than the penta. The average chain length was 2.12.

EXAMPLE II

The equipment and experimental procedure described in Example I was also used in this and the following examples.

Urea phosphate (31.8 grams) and monopotassium orthophosphate (18.2 grams) were mixed in a mole ratio of 1.5 and heated in a bath at 150° C. for 20 minutes. The fluid melt was then quenched and analyzed, yielding the following compositions: 11.1 percent total N, 8.1 percent NH$_4$-N, 5.5 percent urea, 55.0 percent P$_2$O$_5$, and 14.6 percent K$_2$O. The average chain length was 1.79, and the phosphate was distributed in the following manner: 27.4 percent ortho-, 34.2 percent pyro-, 23.1 percent tri-, 10.3 percent tetra-, and 1.3 percent other species.

EXAMPLE III

Urea phosphate (21.8 grams) and monopotassium orthophosphate (28.2 grams) were mixed in a mole ratio of 0.67 and stirred and heated in a beaker at 150° C. for 20 minutes. The product was quenched and found by analysis to contain 7.5 percent total N, 5.1 percent NH$_4$-N, 4.5 percent urea, 53.7 percent P$_2$O$_5$, and 21.0 percent K$_2$O. The average chain length of the product was 1.42, and the phosphate was distributed as 50.6 percent ortho-, 25.6 percent pyro-, 14.9 percent tri-, 6.6 percent tetra-, 1.5 percent penta-, and 0.8 percent other species.

EXAMPLE IV

Urea phosphate (11.3 grams) and monopotassium orthophosphate (38.7 grams) were mixed in a mole ratio of 0.25 and stirred and heated in a beaker at 150° C. for 20 minutes. The product was quenched and found by analysis to contain 3.7 percent total N, 2.5 percent $NH_4$-N, 2.3 percent urea, 52.4 percent $P_2O_5$, and 27.8 percent $K_2O$. The product had an average chain length of 1.17; and the phosphate was distributed as 75.8 percent, ortho-, 12.8 percent pyro-, 7.4 percent tri-, 3.2 percent tetra-, and 0.9 percent pentapolyphosphate.

EXAMPLE V

Urea phosphate (35.0 grams) and monopotassium orthophosphate (15.0 grams) were mixed in a mole ratio of 2.0 and stirred and heated in a breaker at 175° C. for three minutes. The fluid melt was quenched and found by analysis to contain 13.4 percent N, 8.9 percent $NH_4$-N, 8.7 percent urea, 53.8 percent $P_2O_5$, and 11.8 percent $K_2O$. The product had an average chain length of 1.73, and 74 percent of its phosphate was in the form of short-chain linear species.

EXAMPLE VI

Urea phosphate (79.0 grams) and monopotassium orthophosphate (68.0 grams) were mixed in a mole ratio of 1.0 and stirred and heated in a beaker at 175° C. for 10 minutes. The fluid melt was quenched and found by analysis to contain 9.8 percent total N, 7.6 percent $NH_4$-N, 4.1 percent urea, 50.3 percent $P_2O_5$, and 18.1 percent $K_2O$. The product had an average chain length of 1.63, and its phosphate was distributed as 34.0 percent ortho-, 36.0 percent pyro-, 20.1 percent tri-, 7.1 percent tetra-, 2.3 percent penta-, and 0.4 percent other species.

EXAMPLE VII

Urea phosphate (79.0 grams) and monopotassium orthophosphate (68.0 grams) were mixed in a mole ratio of 1.0 and stirred and heated in a beaker at 175° C. for 15 minutes. The fluid melt was quenched and found by analysis to contain 9.0 percent total N, 7.7 percent $NH_4$-N, 2.1 percent urea, 51.1 percent $P_2O_5$, and 19.1 percent $K_2O$. The average chain length was 1.76, and the phosphate was distributed as 27.9 percent ortho-, 36.5 percent pyro-, 23.1 percent tri-, 9.1 percent tetra-, 3.1 percent penta-, and 0.3 percent other species. A portion of the product was dissolved in dilute aqueous ammonia solution by stirring and warming the solution to 50°-60° C. The clear, fluid solution had a pH of 6.0, and it remained free of solids for at least two months when stored at 0° C. with occasional mixing except for a trace amount of small biuret crystals which redissolved when the solution was warmed to room temperature. The solution had a fertilizer grade N-$P_2O_5$-$K_2O$ of 7.5-38.4-12.2 and contained 58.1 percent total plant nutrient.

EXAMPLE VIII

Urea phosphate (79.0 grams) and monopotassium orthophosphate (68.0 grams) were mixed in a mole ratio of 1.0 and stirred and heated in a beaker at 175° C. for 20 minutes. The fluid melt was quenched and found by analysis to contain 8.3 percent N, 7.5 percent $NH_4$-N, 1.2 percent urea, 53.3 percent $P_2O_5$, and 19.3 percent $K_2O$. The average chain length was 1.87; and the phosphate was distributed as 23.2 percent ortho-, 37.6 percent pyro-, 24.3 percent tri-, 9.9 percent tetra-, 4.1 percent penta-, and 0.8 percent other species. A portion of the product was dissolved in aqueous ammonia solution by stirring and warming to 50°-60° C. The clear, fluid solution had a pH of 6.0, and it remained free of solids for at least two months when stored at 0° C. with occasional mixing except for a trace amount of biuret crystals which redissolved upon warming to room temperature and had no significant effect on the properties of the solution. The solution had a fertilizer grade N-$P_2O_5$-$K_2O$ of 6.7-37.8-12.3 and contained 56.8 percent total plant nutrient.

EXAMPLE IX

Urea (30.0 grams), $KH_2PO_4$ (68.9 grams), and 54 percent $P_2O_5$ wet-process phosphoric acid (67.0 grams) were stirred together and heated in a 175° C. bath for 20 minutes. Considerable foaming occurred for the first 12 minutes, and the temperature did not exceed 133° C. during this period. The foam then collapsed, and the temperature rose rapidly to 152° C. where it remained for the rest of the test period. The product was a viscous melt at the end of the reaction but could still be stirred. After cooling, the product was porous and easily crushed; it contained some crystalline $KH_2PO_4$ but was mostly amorphous. It was found by analysis to contain 8.8 percent total N, 7.0 percent $NH_4$-N, 0.2 percent biuret-N, 52.5 percent $P_2O_5$, and 17.7 percent $K_2O$. It had an average chain length of 1.58; and the phosphate was distributed as 34.7 percent ortho-, 43.3 percent pyro-, 17.4 percent tri-, 3.2 percent tetra-, and 1.4 percent other species.

After sifting and winnowing through the data supra, as well as other results of tests and operation of our new, novel, and improved method of production for ammonium potassium polyphosphates, we now present the acceptable and preferred parameters and variables as shown below.

|  | Operating range | Preferred (about) | Most preferred |
|---|---|---|---|
| Reaction conditions |  |  |  |
| Mole ratio |  |  |  |
| Urea: $KH_2PO_4$ | 0.25–4.0 | 0.5–2.5 | 0.67–2.0 |
| Urea: $H_3PO_4$ | 0.5–2.0 | 0.7–1.5 | 0.9–1.1 |
| Temperature, °C. | 130–200 | 140–180 | 150–175 |
| Retention time, min. | 0.5–30 | 3–20 | 5–15 |
| $H_3PO_4$* concentration, % $P_2O_5$ | 54–76 | 61–74 | 69–73 |
| Product |  |  |  |
| Average chain length | 1.2–2.5 | 1.3–2.2 | 1.4–1.9 |
| Dissolution conditions |  |  |  |
| Temperature, °C. | 25–125 | 50–105 | 60–90 |
| pH (5% solution) | 5.8–6.5 | 5.9–6.3 | 6.0–6.1 |

*Pertains only to the embodiment in which phosphoric acid, urea, and monopotassium orthophosphate are charged.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for producing ammonium potassium polyphosphate fertilizer solution, which comprises
   a. reacting urea phosphate with $KH_2PO_4$ in a mole ratio ranging from about 0.25 to about 4.0 at a temperature in the range from about 130° C. to about 200° C. for a time period ranging from about 0.5 to about 30 minutes to thereby yield a melt of ammonium potassium polyphosphate wherein the average chain length ranges from about 1.2 to about 2.5;

b. quenching the resulting reaction melt to a temperature ranging between about 25° C. and about 125° C. in aqueous ammonia, said aqueous ammonia being of sufficient concentration to form an ammonium potassium polyphosphate fertilizer solution having a plant food content of more than 50 weight percent and a pH ranging between about 5.8 and about 6.5.

2. A process for producing ammonium potassium polyphosphate fertilizer solution, which comprises a. reacting urea, $KH_2PO_4$, and phosphoric acid, said phosphoric acid containing between about 54 and about 72 percent $P_2O_5$, in a mole ratio urea:$H_3PO_4$ ranging from about 0.5 to about 2.0 and urea:$KH_2PO_4$ mole ratio ranging from about 0.25 to about 4.0 at a temperature ranging between about 130° C. and about 200° C. for a time period ranging from about 0.5 to about 30 minutes to thereby yield a melt of ammonium potassium polyphosphate wherein the average chain length ranges from about 1.2 to about 2.5;

b. quenching the resulting reaction melt to a temperature ranging between about 25° C. and about 125° C. in aqueous ammonia, said aqueous ammonia being of sufficient concentration to form a concentrated ammonium potassium polyphosphate fertilizer solution having a plant food content of more than 50 percent and a pH ranging between about 5.8 and about 6.5.

3. The process of claims 1 or 2 wherein said aqueous ammonia concentration ranges from about 1 to about 5 percent.

* * * * *